UNITED STATES PATENT OFFICE

2,252,713

LOCAL ANESTHETIC INTERMEDIATE AND PROCESS FOR MANUFACTURING THE SAME

Samuel D. Goldberg, Jamaica Estates, and William F. Ringk, Hollis, N. Y., assignors to Novocol Chemical Mfg. Co. Inc., Brooklyn, N. Y., a corporation of New York No Drawing. Application November 5, 1938, Serial No. 238,990

14 Claims. (Cl. 260—472)

This invention relates to local anesthetics, intermediates therefor and processes for manufacturing the same.

The principal object of the present invention is to produce a series of new compounds and a series of intermediates for the preparation thereof, as well as to produce a simple practical process for the manufacture of the same. Although both the intermediates and compounds are primarily intended for production of local anesthetics their use is not restricted thereto.

The invention comprises the novel products as well as the novel processes and steps of processes according to which such products are manufactured, the specific embodiments of which are described hereinafter by way of example and in accordance with which we now prefer to practice the invention.

We have found, in accordance with our invention, that the mono lower alkyl amino ethyl amino benzoates in which at least one of the hydrogens of the ethyl chain is substituted by an alkyl group, said compounds having a formula

in which R is an alkyl or hydrogen group and at least one R is an alkyl group, are valuable and improved anesthetics. The anesthetics made according to our invention are especially valuable as surface anesthetics and are therefore particularly useful in operations which require surface application of the anesthetic, for example, surgical operations on the eye. The local anesthetic now usually employed for eye operations is butyn. We have found that our invention includes a local anesthetic which may be used in smaller doses than butyn to give at least as quick an effect and a more profound anesthesia.

In accordance with our invention intermediates including substituted ethanols are prepared and these intermediates are reacted with a nitro benzoyl compound to form a corresponding mono alkyl amino substituted ethyl nitro benzoate which is then reduced to form a mono alkyl amino substituted ethyl amino benzoate.

The methods which we now prefer for producing these ethanol intermediates will be described. It is to be understood that the following examples are illustrative of the invention and that the invention is not to be considered as restricted thereto except as indicated in the appended claims. The preparation of intermediates as we prefer to practice it involves treating a substituted glycol chloro hydrin having a formula

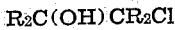

with a mono lower alkyl amine and recovering therefrom the corresponding mono alkyl amino ethanol having a formula Alkyl NHC₂R₄OH. As an example we might take isobutylene glycol alpha chlorohydrin (made from isobutylene and hypochlorous acid) and react it with a primary amine to obtain a mono lower alkyl amino alpha dimethyl ethanol.

1. The preparation of mon methyl amino alpha dimethyl ethanol

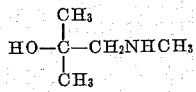

M. W. (molecular weight)=103

To 46 grams (.46 mol.) of a 32% water solution of monomethyl amine and 100 cc. of water contained in a 250 cc. pressure bottle was quickly added 25 grams (0.23 mol.) of isobutylene glycol alpha chlorohydrin and the flask immediately stoppered and shaken. In about three minutes a mild reaction set in with the liberation of some heat. The reaction mixture which had separated into two dark drown oily layers was allowed to stand at room temperature for five hours, after which the reaction was considered complete. Solid NaOH (sodium hydroxide) was then added which caused the amino alcohol to separate out. An ether extract was made, the ether extract dried over solid NaOH (sodium hydroxide) and the ether evaporated off.

The residue was fractionated twice and there was obtained a fraction boiling between 142–143° C., of a water white liquid with a slight ammoniacal odor. Yield=8.2 grams or 34.6% of theory. It has the following further constants:

Specific gravity at 23° C.=.8875.

$$n_D^{20°C.} \text{(refractive index)} = 1.4338$$

The picrate of the amino alcohol was prepared as canary yellow needles, melting at 137–138° C.

2. The preparation of mono ethyl amino alpha dimethyl ethanol

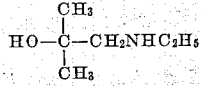

M. W.=117

In a similar manner the mono ethyl amino alpha dimethyl ethanol was prepared. It is a water white liquid with a slight ammoniacal odor and has the following constants: B. P. (boiling point), 152°–153° C.

Specific gravity=.8777 at 19° C.

$$n_D^{20°C.} = 1.4344$$

The picrate, yellow needles, melted at 132–133° C.

3. The preparation of mono n-propyl amino alpha dimethyl ethanol

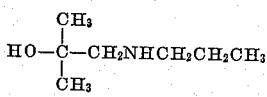

M. W.=131

To 50 cc. of 95% alcohol in a 200 cc. round bottomed flask was added 25 grams (0.23 mol.) of isobutylene glycol alpha chlorohydrin and 20 grams (0.35 mol.) of n-propyl amine (B. P. 48.7° C.). A 24" reflux condenser was attached to the flask and the mixture refluxed gently on a water bath for 3 hours. The reaction mixture was cooled and an excess of concentrated HCl (hydrochloric acid) added until an acid reaction was obtained which formed the hydrochlorides of the amino alcohol and any unreacted n-propyl amine. The material in the flask was then vacuum distilled until no more liquid distilled over. To the cold residue in the flask was added an excess of 30% NaOH (sodium hydroxide) solution to neutralize the HCl (hydrochloric acid), with cooling. The top oily layer was extracted with ether, the ether layer separated and dried over solid NaOH (sodium hydroxide) for several hours. The ether was then evaporated and the residue distilled. The fraction boiling between 165 and 185° C. was collected. This fraction was refractionated and the portion boiling at 169–171° C. was saved. The yield was 13.1 grams of a white liquid with an ammoniacal odor or 44% of theory. It has the following further constants:

Specific gravity =.8646 at 19° C.

$n_D^{20°C.} = 1.4335$

The picrate, yellow needles, melted at 128–129° C.

Using the procedure just mentioned the members given below of this series of amino alcohols all of which were water white liquids with an ammoniacal odor have been prepared. The time required for refluxing the reacting material given as three hours in the mono-n-propyl compound will vary from about three to twenty hours, according to the size of the alkyl group being substituted in the amino group. The members prepared and the other constants are as follows:

4. Mono iso-propyl amino alpha dimethyl ethanol

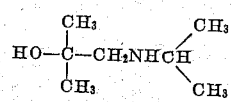

M. W.=131

B. P. =158–160° C.
Specific gravity=.8528 at 19° C.

$n_D^{20°C.} = 1.4288$

The picrate, yellow needles, melted at 166–167° C.

5. Mono n-butyl amino alpha dimethyl ethanol

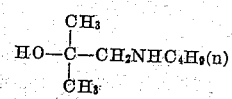

M. W.=145

B. P.=186–187° C.
Specific gravity=.8586 at 20° C.

$n_D^{20°C.} = 1.4362$

The picrate, golden yellow needles from xylene, melted at 121.5–122.5° C.

6. Mono iso-butyl amino alpha dimethyl ethanol

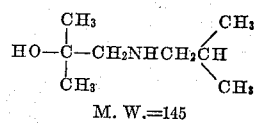

M. W.=145

B. P.=180–181° C.
Specific gravity=.8490 at 20° C.

$n_D^{20°C.} = 1.4309$

The picrate, yellow needles, melted at 138–139° C.

7. Mono n-amyl amino alpha dimethyl ethanol

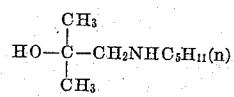

M. W.=159

B. P.=205–208° C.
Specific gravity=.8543 at 20° C.

$n_D^{20°C.} = 1.4388$

The picrate, yellow needles from benzene, melted at 109–110° C.

8. Mono iso-amyl amino alpha dimethyl ethanol

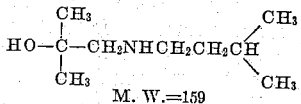

M. W.=159

B. P.=202–204° C.
Specific gravity=.8580 at 19° C.

$n_D^{20°C.} = 1.4380$

The picrate, yellow needles, melted at 145–146° C.

Another process for the production of the intermediate ethanols is that employing the Grignard reaction. As an example, mono n-butyl amino alpha diethyl ethanol can be made through the reaction between beta chloro alpha diethyl ethanol and n-butyl amine. The beta chloro alpha diethyl ethanol is made either through the reaction between a chloro ester or a chloro ketone and the Grignard reagent (ethyl magnesium halide).

The following are the formula and physical constants of the above mentioned ethanol. These are oily liquids which are water white and have an ammoniacal odor:

9. Mono n-butyl amino alpha diethyl ethanol

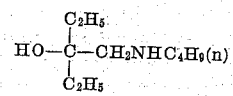

M. W.=173

B. P.=216–220° C. at 760 m. m.
Specific gravity=.8629 at 26° C.

$n_D^{23°C.} = 1.4433$

The picrate, canary yellow needles, recrystalized from benzene, melted at 127–128° C.

10. Mono iso-butyl amino alpha diethyl ethanol

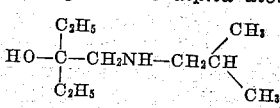

M. W.=173

B. P.=62–65° C. at 1 m. m.; 214–216° C. at 760 m. m.
Specific gravity=.8621 at 21° C.
The picrate, recrystallized from benzene, melted at 130.5–131.5° C.

The mono alkyl amino substituted ethanols are combined with a nitro benzoyl radical and the nitro compound formed, then reduced to form the anesthetic base. As an example, the reaction of mono alkyl amino alpha dimethyl ethanol with para nitro benzoyl chloride is as follows:

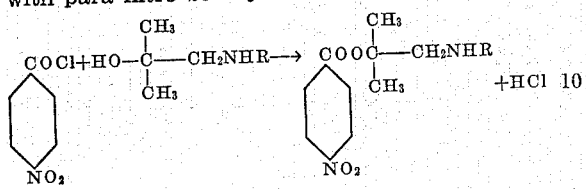

and the reduction as follows:

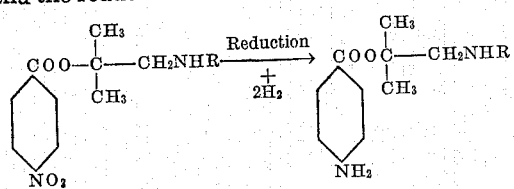

The following is an example of the procedure for the manufacturing of the various combinations of the ethanols to form the mono lower alkyl amino ethyl amino benzoates in which at least one of the hydrogens of the ethyl chain is substituted by an alkyl group. It is to be understood that these examples are illustrative and the invention is not to be considered as restricted thereto except as indicated in the appended claims.

11. *The preparation of normal amyl amino alpha dimethyl ethyl para amino benzoate*

To 10 grams of mono n-amyl amino alpha dimethyl ethanol and 2 grams of sodium hydroxide in 200 cc. of water is added 12 grams of powdered para nitro benzoyl chloride with stirring. The temperature of the reaction is controlled so that it does not go above 50° C. The reaction sets in almost immediately and forms a thick viscous oil which solidifies after stirring for about 30 minutes. The nitro base (mono n-amyl amino alpha dimethyl ethyl para nitro benzoate) that is formed, is filtered off on a Buchner funnel, washed with water till free from alkali and then dried. There is obtained 18.5 grams of crude nitro base (95% of theory) which on crystallization from ether yields a pure compound melting at 107–109° C.

The nitro base is then reduced using the following procedure:

To 11 grams of tin and 50 cc. of concentrated hydrochloric acid is added gradually, with stirring, 15 grams of mono n-amyl amino alpha dimethyl ethyl para nitro benzoate. The temperature of the reaction is controlled so that it is maintained between 50–70° C. The reaction mixture is allowed to stir for ½ to ¾ of an hour at this temperature to complete the reduction and then diluted with water. An excess of a 30% sodium hydroxide solution is added to the cold reduction mixture causing the amino base to separate out as an oil which is extracted with ether. The ether layer is separated and dried, the ether then evaporated and the residue heated to 105° C. There is obtained 11 grams of crude amino base (81% of theory). The required quantity of concentrated sulphuric acid is added to a solution of the base in isopropanol, to form the mono sulphate. After two recrystallizations from isopropanol a white crystalline sulphate is obtained at 158.5°–159.5° C.

In a similar manner the following anesthetic compounds which are crystalline solids have been prepared:

12. *The sulphate of mono normal propyl amino alpha dimethyl ethyl para amino benzoate*

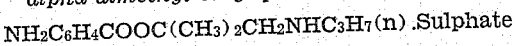

M. P. (melting point) = 139–140° C.

13. *The sulphate of mono normal butyl amino alpha dimethyl ethyl para amino benzoate*

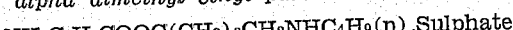

M. P. = 150–153° C. (Contains 1 mole of water of crystallization)

14. *The sulphate of mono isobutyl amino alpha dimethyl ethyl para amino benzoate*

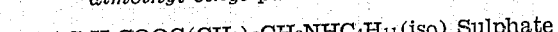

M. P. = 142–143° C.

15. *The sulphate of mono iso-amyl amino alpha dimethyl ethyl para amino benzoate*

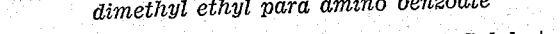

M. P. = 146–148° C.

16. *Mono normal butyl amino alpha diethyl ethyl para amino benzoate*

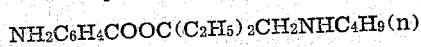

M. P. = 89–91° C.

17. *The sulphate of mono iso-butyl amino alpha diethyl ethyl para amino benzoate*

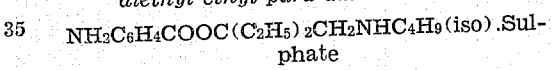

M. P. = 131–133° C.

The mono lower alkyl amino substituted ethyl amino benzoates in which at least one of the hydrogens of the ethyl chain is substituted by an alkyl group as described above and embodiments of which are given in the various examples are valuable anesthetics and represent an improvement over the standard anesthetics such as procaine. The anesthetics made in accordance with our invention are particularly valuable as surface anesthetics and may be usefully employed where such anesthetics are indicated, for example, in eye operations. The processes for manufacturing these anesthetics and the intermediates therefor are simple and practical. The intermediates produced are especially useful in the production of local anesthetics but their use is not restricted thereto.

In the appended claims, where the context permits, the expressions, "a mono lower alkyl amino substituted ethyl amino benzoate," "a mono butyl amino substituted ethyl amino benzoate" and similarly indicated compounds, are intended to indicate not only the bases designated thereby but also the water soluble salts of such bases such as the hydrochloride, sulphate and other water soluble salts.

The expression "mono butyl amino" as employed in the claims, is intended to cover both the mono normal butyl amino compound as well as compounds containing the isomers of the mono butyl group. Similarly the expressions "mono amyl amino" and "mono propyl amino" are intended to cover both the normal compounds and the isomers thereof.

The expression "mono lower alkyl amino ethyl amino benzoate" is used not only to cover the compounds herein specifically given as the preferred form of our invention but as well, compounds having the same general properties as our preferred compounds, for the purpose stated. The expression "ethyl chain" as employed in the claims is intended to designate the chain $C_2R_4$ between the oxygen of the benzoyl radical and the nitrogen of the amino group as underscored in the following formula:

$$NH_2C_6H_4COO\underline{C_2R_4NH}Alkyl$$
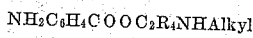
Ethyl chain

While we have described our improvements in great detail and with respect to preferred forms thereof, we do not desire to be limited to such details and forms since many changes and modifications may be made and the invention embodied in widely different forms without departing from the spirit and scope thereof in its broader aspects. Hence we desire to cover all modifications, forms and embodiments coming within the language or scope of any one or more of the appended claims. Matter not herein claimed is claimed in a divisional application about to be filed.

What we claim as new and desire to secure by Letters Patent is:

1. As a new compound a mono lower alkyl amino substituted ethyl amino benzoate, having a formula $NH_2C_6H_4COOC_2R_4NH$ Alkyl, where Alkyl refers to a lower alkyl radical and where R is selected from the group consisting of hydrogen and a lower alkyl radical, said NH Alkyl radical containing not more than five carbon atoms.

2. As a new compound a mono lower alkyl amino substituted ethyl amino benzoate having a formula $NH_2C_6H_4COOC_2R_4NH$ Alkyl, where R is selected from the group consisting of hydrogen and a lower alkyl radical and at least one R is a lower alkyl radical.

3. As a new compound a mono butyl amino substituted ethyl amino benzoate, said compound having a formula $$NH_2C_6H_4COOC_2R_4NHC_4H_9$$

where R is selected from the group consisting of hydrogen and a lower alkyl radical and at least one R is a lower alkyl radical.

4. As a new compound a mono lower amyl amino substituted ethyl amino benzoate, in which at least one of the hydrogens of the ethyl chain is substituted by a lower alkyl radical, said compound having a formula $$NH_2C_6H_4COOC_2R_4NHC_5H_{11}$$

where R is selected from the group consisting of hydrogen and a lower alkyl radical and at least one R is a lower alkyl radical.

5. As a new compound a mono alkyl amino alpha dimethyl ethyl amino benzoate having the formula $NH_2C_6H_4COOC(CH_3)_2.CH_2NH$ Alkyl, said NH alkyl radical containing a lower alkyl radical.

6. As a new compound a mono butyl amino alpha dimethyl ethyl amino benzoate having the formula $NH_2C_6H_4COOC(CH_3)_2CH_2NHC_4H_9$.

7. As a new compound a mono amyl amino alpha dimethyl ethyl amino benzoate having the formula $NH_2C_6H_4COOC(CH_3)_2CH_2NHC_5H_{11}$.

8. As a new compound a mono butyl amino alpha diethyl ethyl amino benzoate having the formula $NH_2C_6H_4COOC(C_2H_5)_2CH_2NHC_4H_9$.

9. A process for producing an anesthetic base which comprises combining a nitro benzoyl compound with a compound comprising a secondary amino ethanol having a lower alkyl substituted ethyl chain to form a corresponding mono alkyl amino substituted ethyl nitro benzoate, and reducing the resulting compound to form a mono alkyl amino ethyl amino benzoate having a substituted ethyl chain.

10. A process for producing an anesthetic base which comprises combining a nitro benzoyl compound with a compound having the formula $HOC_2R_4NH$ Alkyl in which R is selected from the group consisting of hydrogen and a lower alkyl radical and at least one R is alkyl, to form a compound having the formula

and reducing the last-named compound to form a compound having the formula

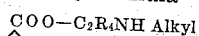

said Alkyl radical being a lower alkyl radical.

11. A process for producing an anesthetic base which comprises combining a nitro benzoyl compound with a compound having the formula $HOC(CH_3)_2CH_2NH$ Alkyl to form a compound having the formula $$NO_2C_6H_4.COOC—(CH_3)_2CH_2NH\ Alkyl$$

and reducing the last-named compound to form a compound having the formula $$NH_2C_6H_4COOC(CH_3)_2CH_2NH\ Alkyl$$

said alkyl radical being a lower alkyl radical.

12. A process for producing an anesthetic base which comprises combining a nitro benzoyl compound with a compound having the formula $HOC(C_2H_5)_2CH_2NH$ Alkyl to form a compound having the formula $$NO_2C_6H_4.COOC—(C_2H_5)_2CH_2NH\ Alkyl$$

and reducing the last-named compound to form a compound having the formula $$NH_2C_6H_4.COOC—(C_2H_5)_2CH_2NH\ Alkyl$$

said alkyl radical being a lower alkyl radical.

13. A process for producing an anesthetic base which comprises transforming a nitro benzoyl compound into an intermediate nitro benzoyl compound with a lower alkyl amino substituted ethyl chain and upon reduction of the nitro group into a mono lower alkyl amino substituted ethyl amino benzoate.

14. As a new compound a mono lower alkyl amino substituted ethyl amino benzoate, having a formula $NH_2C_6H_4COOC_2R_4NH$ lower Alkyl, where R is selected from the group consisting of hydrogen and a lower alkyl radical, said NH lower Alkyl radical containing at least three carbon atoms.

SAMUEL D. GOLDBERG.
WILLIAM F. RINGK.

CERTIFICATE OF CORRECTION.

Patent No. 2,252,713. August 19, 1941.

SAMUEL D. GOLDBERG, ET AL.

It is hereby certified that error appears in the printed specification of the above numbered patent requiring correction as follows: Page 1, second column, line 6, for "mon" read --mono--; page 3, first column, line 74, before "at" insert --melting--; same page, second column, line 18, in the formula, for "$H_{11}$" read --$H_9$--; and that the said Letters Patent should be read with this correction therein that the same may conform to the record of the case in the Patent Office.

Signed and sealed this 7th day of October, A. D. 1941.

(Seal)

Henry Van Arsdale,
Acting Commissioner of Patents.